United States Patent
Koyanagi

(10) Patent No.: US 9,505,270 B2
(45) Date of Patent: Nov. 29, 2016

(54) PNEUMATIC RADIAL TIRE

(75) Inventor: Jun Koyanagi, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 63 days.

(21) Appl. No.: 14/123,993

(22) PCT Filed: Jul. 13, 2012

(86) PCT No.: PCT/JP2012/004553
§ 371 (c)(1),
(2), (4) Date: Dec. 5, 2013

(87) PCT Pub. No.: WO2013/008478
PCT Pub. Date: Jan. 17, 2013

(65) Prior Publication Data
US 2014/0110026 A1    Apr. 24, 2014

(30) Foreign Application Priority Data

Jul. 14, 2011    (JP) .................................. 2011-156052

(51) Int. Cl.
*B60C 11/13*    (2006.01)
*B60C 11/03*    (2006.01)

(52) U.S. Cl.
CPC ........ *B60C 11/0302* (2013.04); *B60C 11/0311* (2013.04); *B60C 11/0316* (2013.04); *B60C 11/1323* (2013.04); *B60C 2011/0313* (2013.04); *B60C 2011/0344* (2013.04); *B60C 2011/1338* (2013.04); *B60C 2200/065* (2013.04)

(58) Field of Classification Search
CPC ........... B60C 11/0302; B60C 11/1323; B60C 11/04; B60C 11/042; B60C 11/047; B60C 11/0311; B60C 2011/0344; B60C 2011/0313; B60C 2011/1338; B60C 11/1338; B60C 2011/0383
USPC ..................................................... 152/209.21
See application file for complete search history.

(56) References Cited

U.S. PATENT DOCUMENTS

| | | | |
|---|---|---|---|
| 2,756,798 A * | 7/1956 | Palko et al. ............. | 152/209.28 |
| 4,362,201 A * | 12/1982 | Zinnen et al. ........... | 152/209.22 |
| 6,260,594 B1 * | 7/2001 | Bonko ................ | B60C 11/0302 |
| | | | 152/209.1 |
| 7,004,216 B2 * | 2/2006 | Godefroid ................ | 152/209.18 |
| 2011/0005651 A1 * | 1/2011 | Mori ........................ | 152/209.18 |
| 2011/0017375 A1 * | 1/2011 | Aoki ................... | B60C 11/0316 |
| | | | 152/209.24 |

FOREIGN PATENT DOCUMENTS

| | | |
|---|---|---|
| EP | 0599566 A1 | 6/1994 |
| EP | 0640498 A1 | 3/1995 |
| EP | 0729854 A2 | 9/1996 |
| EP | 0729854 B1 | 5/1999 |
| JP | A-58-22301 | 2/1983 |

(Continued)

OTHER PUBLICATIONS

English machine translation of JP05-286419, dated Nov. 1993.*

(Continued)

*Primary Examiner* — Steven D Maki
*Assistant Examiner* — Robert Dye
(74) *Attorney, Agent, or Firm* — Oliff PLC

(57) ABSTRACT

A pneumatic radial tire according to the present invention has a tread pattern specifying a tire rotation direction and an optimized shape of a groove wall on a kicking-out side of a lateral groove.

7 Claims, 4 Drawing Sheets

(56) References Cited

FOREIGN PATENT DOCUMENTS

| JP | A-64-36506 |   | 2/1989 |
|----|------------|---|--------|
| JP | 05-286419 | * | 11/1993 |
| JP | A-10-264612 |   | 10/1998 |
| JP | A-2000-1106 |   | 1/2000 |
| JP | 2001-055017 | * | 2/2001 |
| JP | 2006-131177 | * | 8/2006 |
| JP | A-2006-213177 |   | 8/2006 |
| JP | A-2007-83822 |   | 4/2007 |
| JP | A-2007-191093 |   | 8/2007 |
| JP | 2008-279976 | * | 11/2008 |
| JP | 2010-023610 | * | 2/2010 |
| WO | WO2010/044319 | * | 4/2010 |

OTHER PUBLICATIONS

English machine translation of JP2010-023610, dated Feb. 2010.*

English machine translation of WO2010/044319, dated Apr. 2010.*

English machine translation of JP2001-055017, dated Feb. 2001.*

English machine translation of JP2006-131177, dated Aug. 2006.*

Oct. 28, 2014 Office Action issued in Japanese Patent Application No. JP2011-156052.

Feb. 17, 2015 Extended European Search Report issued in European Application No. 12811699.3.

International Search Report issued in International Patent Application No. PCT/JP2012/004553 dated Sep. 18, 2012.

Jun. 25, 2015 Office Action issued in Chinese Patent Application No. 201280033557.4.

Jun. 30, 2015 Office Action issued in Austrailian Application No. 2012281958.

Sep. 29, 2015 Office Action issued in Australian Patent Application No. 2012281958.

Jun. 30, 2015 Office Action issued in Australian Application No. 2012281958.

* cited by examiner

PNEUMATIC RADIAL TIRE

TECHNICAL FIELD

The present invention relates to a pneumatic radial tire, and more specifically, to a pneumatic tire for a construction vehicle having an improved abrasion resistance.

BACKGROUND ART

Conventionally, a tire for construction vehicles (dump truck and the like) operated mainly in construction sites, mines and the like, in order to improve wear resistance of the tire, typically has an increased volume of tread rubber by increasing a thickness of a tread or, alternatively, by reducing a negative ratio.

However, since the tire for the construction vehicle is used for transport works at a relatively high speed, tire failure may be caused due to heat generation in a tread portion. Such a failure has been a problem particularly for the tire having a large volume of the tread rubber as described above.

For this reason, techniques for improving the abrasion resistance of the tire without increasing the volume of the tread rubber have been actively developed (for example, see Patent Documents 1, 2).

There is also a known technique to provide a tread with a directional pattern and a lug groove in a parallelogram shape, so as to allow gradual stepping from a tread center side.

When a super-large ORR tire is mounted as a front wheel of a vehicle, because of a motion of a belt at the time of tire rolling, a shear stress is increased at a position what is called a ¼ point of the tread and the tread greatly slips at start of kicking-out. According to the above technique, however, the slip in a tread width direction may be suppressed.

RELATED ART DOCUMENTS

Patent Document 1: JP 2007-083822 A
Patent Document 2: JP 2007-191093 A

However, the abrasion resistance of the above techniques are not sufficient, and thus a further improvement in wear performance has been desired.

SUMMARY OF INVENTION

Technical Problem

The present invention, in order to solve the above problem, aims to provide a pneumatic radial tire with an improved abrasion resistance.

Solution to Problem

In order to solve the above problem, the present inventor has diligently researched numerous times.

As a result, the present inventor, by specifying a tire rotation direction and separately considering a stepping side and a kicking-out side of the tire, has acquired a new knowledge that, on that basis, a protrusion provided on a groove wall on the kicking-out side of the lateral groove enables an advantageous achievement of the expected object.

The present invention has been made based on the above finding, and novel aspects thereof are as follows.

A first aspect of the present invention resides in a pneumatic radial tire that includes:

a directional pattern specifying a rotation direction of the tire; and at least one lateral groove provided in a tread surface of the tire extending from a tread end to the inside, in the width direction, of a widthwise midpoint P of a tread half having the tread end, wherein a groove wall on a kicking-out side of the at least one lateral groove has a protruding portion protruding toward a groove wall on a stepping side, and with reference to a point Q representing a midpoint in a tread width direction between the tread end and the widthwise midpoint P, the protruding portion extends in the tread width direction from a position between the point P and the point Q to the inside of the point P in the width direction.

A second aspect of the present invention resides in a pneumatic radial tire according to the first aspect, further including a circumferential groove extending on a tire equatorial plane in a tread circumferential direction, further includes at least one lateral groove that extends outwardly from the circumferential groove in the tread width direction and remains within the tread surface.

A third aspect of the present invention resides in a pneumatic radial tire according to the second aspect, wherein the lateral groove at least partially overlaps the lateral groove when projected in a tire circumferential direction.

Here, the term "overlap" is intended to include a case in which an overlapping width is 0 mm.

A fourth aspect of the present invention resides in a pneumatic radial tire according to the third aspect, wherein an overlapping area of the lateral groove and the lateral groove measures 0 mm to 20 mm in the tread width direction.

Effect of the Invention

According to the present invention, a pneumatic radial tire with excellent abrasion resistance may be provided.

The tire according to the present invention is particularly suitable as a tire for a construction vehicle operated at a construction site, a mine and the like that is required to have high abrasion resistance.

DESCRIPTION OF EMBODIMENT

Hereinafter, the present invention will be described in detail with reference to the accompanying drawings.

Note that an internal structure and the like of a tire is similar to that of a conventional tire and thus a description thereof will be omitted.

Figure 1:
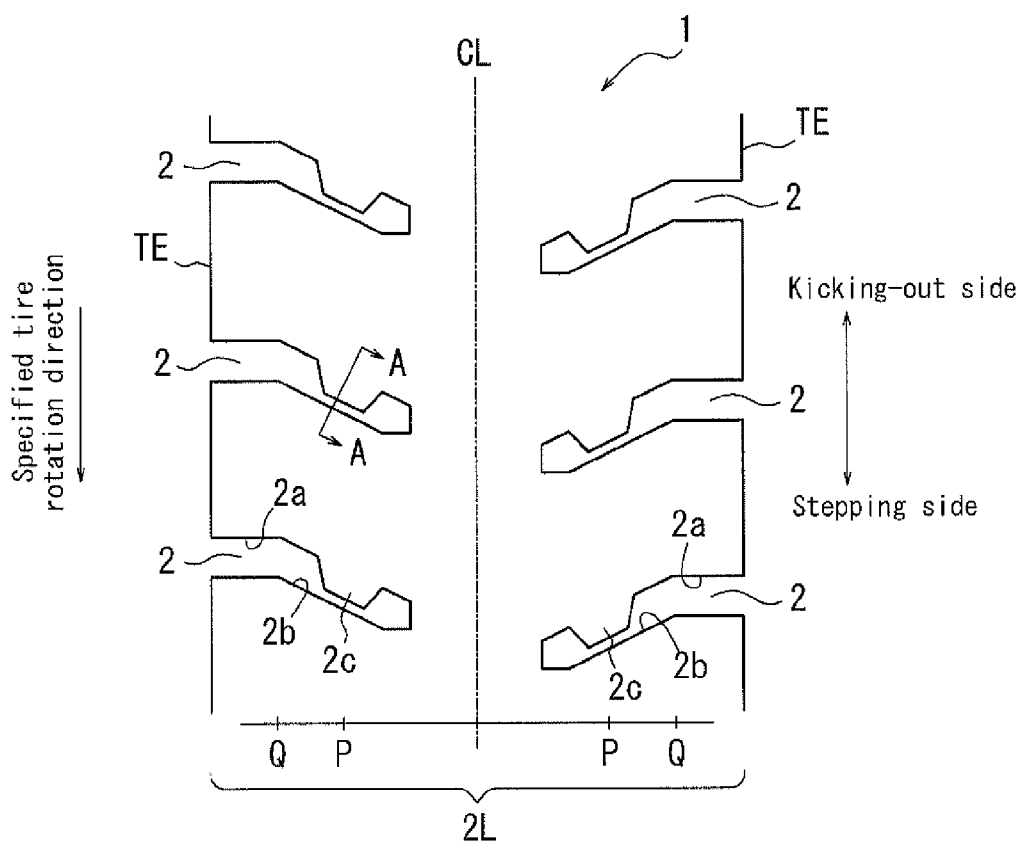
FIG. 1 is a developed view illustrating a tread pattern of a tire according to one embodiment of the present invention.

FIG. 1 is a developed view illustrating a tread pattern of a tire according to one embodiment of the present invention.

As illustrated in FIG. 1, the tread pattern is a directional pattern specifying a tire rotation direction. In FIG. 1, a direction indicated by an arrow with a description "specified tire rotation direction" is the direction specified as the tire rotation direction (a stepping side).

Also, as illustrated in FIG. 1, the tire according to the present invention has at least one lateral groove 2 on a tread surface 1 of the tire extending from a tread end TE to a position which is, relative to the width direction, the inside of a widthwise midpoint P (what is called a ¼ point) of a tread half having the tread end.

In the illustrated embodiment, the tire has six lateral grooves 2 in total; three lateral grooves 2 in each of tread widthwise halves (from a tire equator to one of the tread ends).

Further, a groove wall 2a on a kicking-out side of at least one of the lateral grooves 2 has a protruding portion 2c protruding toward a groove wall 2b on a stepping side.

In all of the six lateral grooves of the illustrated embodiment, the groove walls 2a on the kicking-out side of the lateral grooves 2 have the protruding portions 2c in a shape protruding toward the groove walls 2b on the stepping side.

Here, in the tread width direction, a point Q represents a midpoint (what is called ⅜ points) in the tread width direction between the tread end TE and the widthwise midpoint P of the tread half described above.

At this time, the protruding portion 2c extends in the width direction from a position between the point P and the point Q to the inside of the point P in the width direction.

That is, at least one of the lateral grooves 2 has a narrow portion in an area in the width direction where the protruding portion 2c extends. Namely, a width of the lateral groove in the area where the protruding portion 2c extends is narrower than that in an area where the protruding portion 2c does not extend.

According to the present invention, as described above, it is essential that the groove wall on the kicking-out side of at least one of the lateral grooves has the protruding portion protruding toward the groove wall on the stepping side and, with reference to the point Q representing the midpoint in the tread width direction between the tread end and the widthwise midpoint P, the protruding portion extends in the tread width direction from the position between the point P and the point Q to the inside of the point P in the width direction.

The following describes the operation and effect of the present invention.

According to the present invention, first, specifying the rotation direction of the tire allows separate consideration of the stepping side and the kicking-out side.

Here, a ground contact surface circumferentially slips in a large amount on the tread surface of a land part divided by the stepping side of the lateral groove. Accordingly, by providing the protruding portion at the above position and closing the lateral groove at the time of contact to the ground, the circumferential slip in the land part at the time of kicking-out described above may be suppressed. Thereby, abrasion resistance of the tire may be improved.

Especially, since the protruding portion is provided in the area of the width direction described above, abrasion near a ¼ point where severe wearing occurs may be suppressed.

Figure 2:
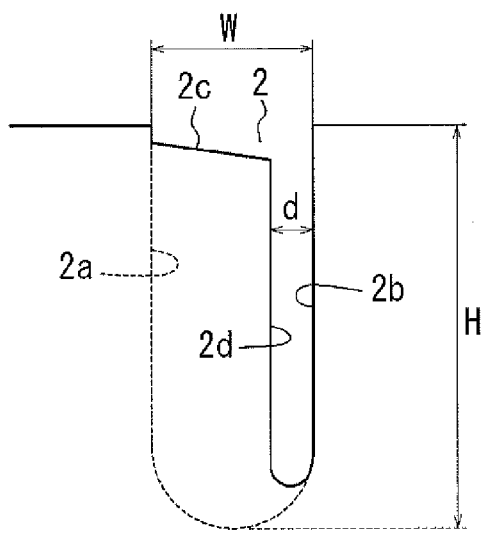
FIG. 2 is a cross-sectional view taken along the line A-A in FIG. 1.

FIG. 2 is a cross-sectional view taken along line A-A in FIG. 1.

FIG. 2 illustrates shapes of the lateral groove and the protruding portion when the tire is mounted on a prescribed rim and filled with the air to have a prescribed internal pressure under no load.

Here, as illustrated in FIG. 2, a wall surface 2d of the protruding portion described above is preferably parallel in the cross section to the wall surface 2 on the stepping side of the lateral groove 2.

This is because, when the tire contacts the ground surface, surfaces of the lateral grooves firmly contact to each other, thereby further suppressing the circumferential slip at the time of knocking-out in the land part described above.

Here, as further illustrated in FIG. 2, a groove bottom is preferably formed such that the protruding portion 2d and the groove bottom smoothly join to each other.

Note that the "prescribed rim" is a rim defined in the JATMA YEAR BOOK 2008 published by Japan Automobile Tire Manufacturers Association, and the "prescribed internal pressure" is an air pressure corresponding to the maximum load capacity (maximum load) defined in JATMA Year Book 2008. Note that, in countries other than Japan, the internal pressure represents an air pressure corresponding to the maximum load (maximum load capacity) of a single wheel defined in the standards mentioned below, and the rim represents a standard rim (or "Approved Rim" or "Recommended Rim") in an applicable size defined in the standards mentioned below. Standards are defined according to industrial standards in each area. These standards include, for example, those as defined in the TRA YEAR BOOK published by The Tire and Rim Association Inc. for the United States, or in the ETRTO STANDARD MANUAL published by The European Tire and Rim Technical Organization for European countries.

Also, as illustrated in FIG. 2, a minimum distance d (mm) between the wall surface 2d of the protruding portion described above and the wall surface 2b on the stepping side of the lateral groove 2 is preferably 15% to 30% of a width W (mm) of the lateral groove.

This is because, when the minimum distance d is not less than 15%, both the wear performance and heat-generation performance may be achieved.

Also because limiting the minimum distance d to be not more than 30% ensures to close the lateral groove at the time of contact to the ground, suppressing the circumferential slip described above.

Further, a tread width 2 L (mm) represents a linear distance in the width direction between two tread ends when the tire is mounted on the prescribed rim having the prescribed internal pressure under no load.

At this time, the protruding portion is preferably provided in the width direction across a predetermined area including a midpoint of the tread halves and, particularly preferably, across an area of at least 40% to 60% of a tread half width L (mm) from a tire equatorial plane CL.

This is because the protruding portion provided in the above area may further ensure to reduce abrasion near the ¼ point where the tire circumferentially slips in a great amount.

As illustrated in FIG. 2, also, the protruding portion is preferably provided across an area of at least 80% to 100% of a depth H (mm) of the lateral groove.

Note that the depth of the lateral groove represents a depth at a position where a tread wear indicator is provided.

This is because the protruding portion provided in the area is highly effective in suppressing the circumferential slip at the time of kicking-out of the land part divided by the stepping side of the lateral groove.

As illustrated in FIG. 1, further, it is preferable to avoid forming an acute angle portion in the land part having the protruding portion described above connected thereto, in order to suppress generation of cracks or chipping of the land part.

As illustrated in FIG. 1, also, the lateral groove 2 preferably inclines to a side of the specified tire rotation direction from the tread end toward the inside in the tread width direction.

This is because, when the lateral groove gradually steps from a tire equatorial plane side, slide in the width direction in the land part may also be suppressed.

Further, an inclination angle a of the lateral groove mentioned above is preferably 5° to 45° relative to the tread width direction.

Also, an internal end portion of the lateral groove in the tread width direction is preferably positioned at the inside of, in the width direction, a position at 0.4 L (mm) from the tire equatorial plane CL outwardly in the tread width direction.

As described above, the protruding portion is preferably provided, in the width direction, across the area of at least 40% to 60% of the tread half L (mm) from the tire equatorial plane CL. Accordingly, in order to provide the protruding portion in the area, the lateral groove preferably extends to the inside of the position at 0.4 L (mm) outside in the tread width direction from the tire equatorial plane CL.

As illustrated in FIG. 1, also, the lateral groove is preferably orthogonal to the tread end TE.

Thereby, the groove bottom of the lateral groove may have a large curvature, suppressing generation of cracks from the groove bottom.

Figure 3:
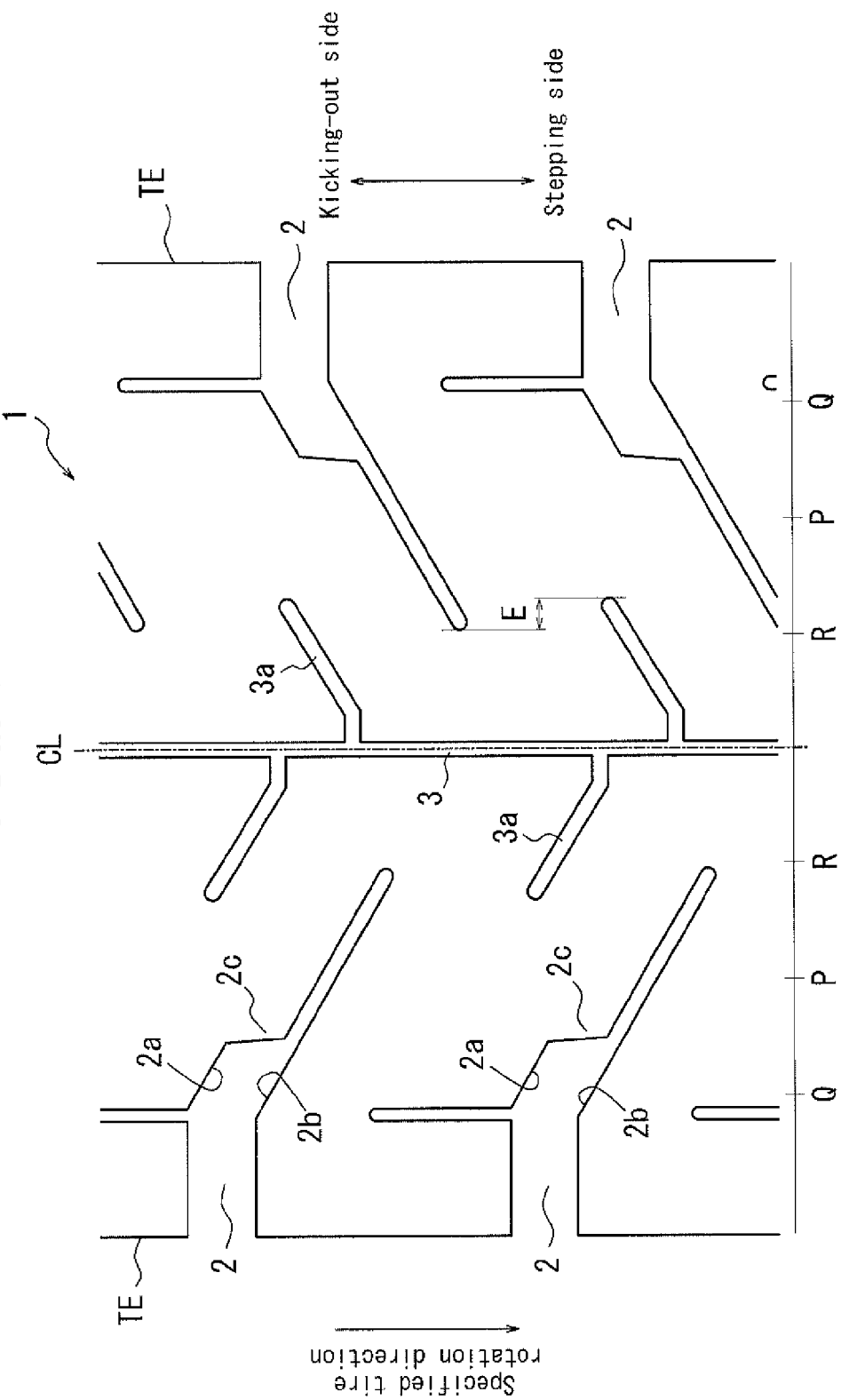
FIG. 3 is a developed view illustrating a tread pattern of a tire according to another embodiment of the present invention.

As illustrated in FIG. 3, further, according to the present invention, it is preferable to have a circumferential groove 3 that extends in the tread circumferential direction on the tire equatorial plane CL and, further, at least one transverse groove 3a that extends from the circumferential groove 3 outwardly in the tread width direction and remains within the tread surface 1.

Thereby, the air flowing through the circumferential groove may be fed to the lateral groove at the time of tire rolling, enabling enhancement of heat dissipation in an entire middle area in the tire width direction where a great amount of heat is generated and improvement in heat generation resistance of the tire.

Here, when a point R represents a midpoint in the tread width direction between the tire equatorial plane CL and the point P described above, the lateral groove preferably extends in an area from a position at 10 mm inside of the point R in the width direction to a position at 10 mm outside of the point R in the width direction.

Also, when the transverse groove is projected in the tire circumferential direction, the lateral groove preferably overlaps the lateral groove at least partially. In other words, the transverse groove preferably extends from a position of an outer end of the lateral groove in the tread width direction to the inside of the lateral groove in the tread width direction. Thereby, the heat dissipation the middle area in the tread width direction may be further enhanced.

At this time, a length E (mm) of an overlapping portion in the width direction is preferably 20 mm or less, whereby rigidity of the land part may be secured.

Also, as illustrated in FIG. 3, the transverse groove and the lateral groove are preferably parallel to each other, from the point of view of securing the rigidity of the land part.

As illustrated in FIG, 3, further, the circumferential groove and the lateral groove preferably join to each other at a right angle.

Thereby, rubber flow is facilitated in vulcanization.

Note that the tire of the present invention is particularly suitable for a deep-groove tire having a tire diameter of 1.5 mm or more and classified into a tread class E-3 or higher defined by JATMA, TRA and the like.

EXAMPLES

In order to ascertain the effect of the present invention, tires according to examples 1, 2 of the present invention having a protruding portion on the groove wall on the kicking-out side of the lateral groove that protrudes toward the groove wall on the stepping side were prototyped.

Also, as a tire of a control example, a tire having a tread pattern similar to that of the tires of the examples 1, 2,except having no protruding portion described above as illustrated in FIG. 5 was prototyped.

Figure 6:
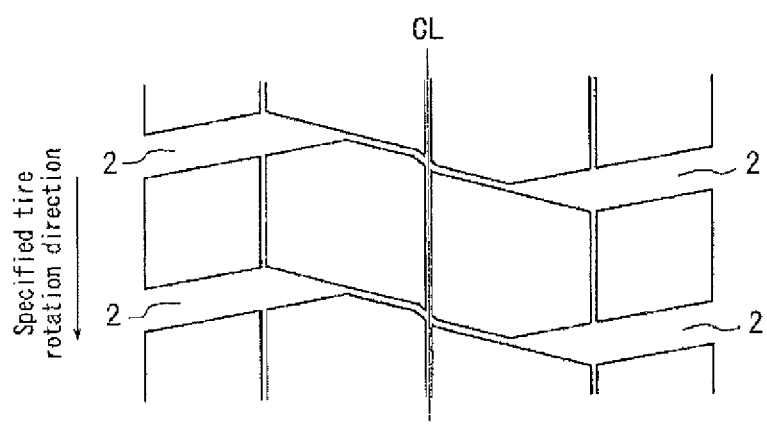
FIG. 6 is a developed view illustrating a tread pattern of a tire according to a conventional example.

Further, as a tire of a conventional example, a tire having a tread pattern of a type illustrated in FIG. 6 was prepared.

Specifications of each of the tires are shown in Table 1.

Here, in Table 1,the term "length of lateral groove" means a length of the lateral groove in the tread width direction. Also, the term "angle of lateral groove" means a tilt angle of the lateral groove relative to the tread width direction. Further, the term "protruding portion" means a portion protruding from the groove wall on the kicking-out side of the lateral groove toward the groove wall on the stepping side, as described above.

Note that a depth of the lateral groove of each tire is 68 mm in common.

Each of the tires described above in size of 46/90R57 was mounted on the prescribed rim, filled with the air to have the prescribed internal pressure, and mounted as a front wheel of a vehicle. Thus, a test for evaluation of the abrasion resistance was conducted.

<Abrasion Resistance>

A drum test was conducted to run the vehicle having each of the above tires mounted thereon at a speed of 80 km/h for a distance of 30000 km.

Evaluation of the abrasion resistance is determined by obtaining a remaining amount of the grooves after running the drum as described above, and the abrasion resistance is represented by an index relative to the abrasion resistance of the conventional tire represented by 100. The smaller the index is, the better the abrasion resistance is.

The results of the evaluation are shown in Table 1 below.

TABLE 1

Figure 4:
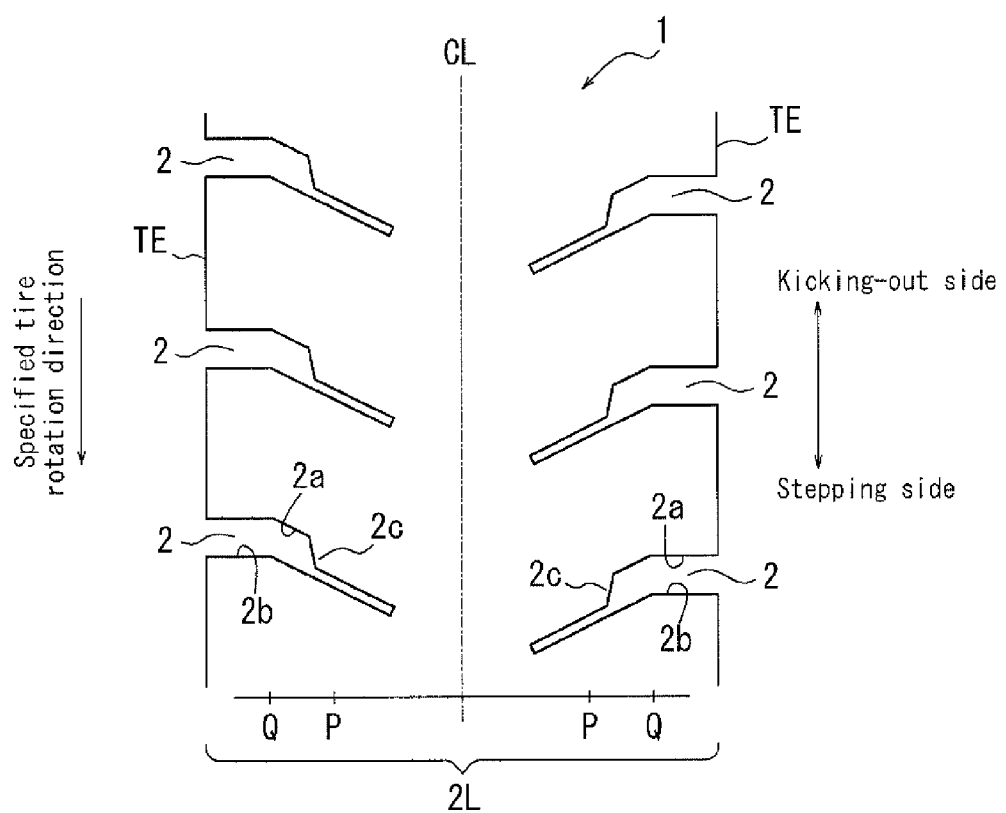
FIG. 4 is a developed view illustrating a tread pattern of a tire according to still another embodiment of the present invention.
Figure 5:
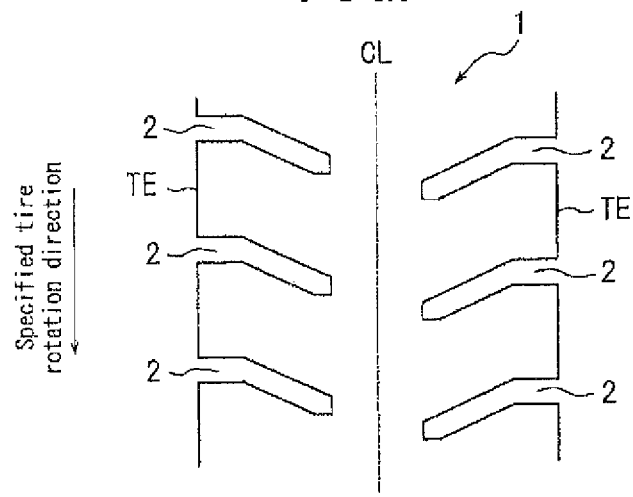
FIG. 5 is a developed view illustrating a tread pattern of a tire according to a control example.

|  | Example 1 of the Invention | Example 2 of the Invention | Control Example | Conventional Example |
|---|---|---|---|---|
| FIGS. | FIG. 1 | FIG. 4 | FIG. 5 | FIG. 6 |
| Length of Lateral groove (mm) | 364 | 364 | 364 | — |
| Angle of Lateral groove (°) | 30 | 30 | 30 | — |
| Width of Lateral groove (mm) | 59 | 59 | 59 | — |

TABLE 1-continued

|  | Example 1 of the Invention | Example 2 of the Invention | Control Example | Conventional Example |
|---|---|---|---|---|
| Presence of Protruding Portion | Yes | Yes | No | No |
| Area of Protruding Portion Extending in Width Direction | 100 mm to 160 mm in width direction from tire equatorial plane | 160 mm from lateral groove end to tire equatorial plane in width direction | No | No |
| Distance d between Protruding Portion and Groove Wall on Stepping Side (mm) | 12 | 12 | — | — |
| Abrasion Resistance | 120 | 130 | 110 | 100 |

As shown in Table 1, both of the tires of Examples 1, 2 have abrasion resistance superior to that of the tires of the conventional example and the control example.

REFERENCE SIGNS LIST 1 tread surface
2 lateral groove
2a groove wall (kicking-out side)
2b groove wall (stepping side)
2c protruding portion
2d groove wall of protruding portion
3 circumferential groove
3a transverse groove
TE tread end
CL tire equatorial plane

The invention claimed is:

1. A pneumatic radial tire comprising:
a directional pattern specifying a rotation direction of the tire;
at least one lateral groove provided in a tread surface of the tire extending from a tread end to the inside, in the width direction, of a widthwise midpoint P of a tread half having the tread end;
a circumferential groove extending on a tire equatorial plane in a tread circumferential direction; and
at least one transverse groove that extends outwardly from the circumferential groove in the tread width direction and remains within the tread surface without crossing any other groove, wherein
a groove wall on only a kicking-out side of the at least one lateral groove has a single protruding portion, the protruding portion protrudes toward a groove wall on a stepping side,
with reference to a point Q representing a midpoint in a tread width direction between the tread end and the widthwise midpoint P, the protruding portion extends in the tread width direction from a position between the point P and the point Q to the inside of the point P in the width direction, and
the lateral groove at least partially overlaps the transverse groove when projected in a tire circumferential direction.

2. The pneumatic radial tire according to claim 1, wherein an overlapping area of the transverse groove and the lateral groove measures 0 mm to 20 mm in the tread width direction.

3. The pneumatic radial tire according to claim 1, wherein the protruding portion has a wall surface that is parallel in cross section to the wall surface on the stepping side of the lateral groove.

4. The pneumatic radial tire according to claim 3, wherein a minimum distance between the wall surface of the protruding portion and the wall surface on the stepping side of the lateral groove is 15% to 30% of a width of the lateral groove.

5. The pneumatic radial tire according to claim 1, wherein the protruding portion is provided in the width direction across an area of at least 40% to 60% of a tread half width L from a tire equatorial plane CL.

6. The pneumatic radial tire according to claim 1, wherein the protruding portion is provided across an area of at least 80% to 100% of a depth H of the lateral groove.

7. The pneumatic radial tire according to claim 1, wherein the lateral groove has an inclination angle of 5° to 45° relative to the tread width direction.

* * * * *